United States Patent
Weghaus et al.

(10) Patent No.: US 7,338,235 B2
(45) Date of Patent: Mar. 4, 2008

(54) INTERNAL BROACH

(75) Inventors: Norbert Weghaus, Burscheid (DE); Otto Pfitzer, Solingen (DE); Andreas Berktold, Neuss (DE)

(73) Assignee: Forst Technologie GmbH & Co. KG, Solingen (DE)

( * ) Notice: Subject to any disclaimer, the term of this patent is extended or adjusted under 35 U.S.C. 154(b) by 0 days.

(21) Appl. No.: 10/725,410

(22) Filed: Dec. 3, 2003

(65) Prior Publication Data

US 2004/0109731 A1    Jun. 10, 2004

(30) Foreign Application Priority Data

Dec. 3, 2002 (EP) ............................ 02027028

(51) Int. Cl.
*B23P 15/42* (2006.01)
(52) U.S. Cl. ............................ 407/13; 407/18; 407/19
(58) Field of Classification Search ............... 407/13, 407/19, 18; 409/259, 287
See application file for complete search history.

(56) References Cited

U.S. PATENT DOCUMENTS

| 1,880,656 | A | * | 10/1932 | Baker | 407/18 |
| 2,276,385 | A | * | 3/1942 | Gotberg | 407/18 |
| 2,441,143 | A | * | 5/1948 | Gracey | 407/18 |
| 2,683,919 | A | * | 7/1954 | Psenka | 407/18 |
| 2,906,004 | A | * | 9/1959 | McVey | 407/1 |
| 2,986,801 | A |   | 6/1961 | Mentley | |
| 3,217,383 | A | * | 11/1965 | Psenka | 407/18 |
| 4,274,767 | A |   | 6/1981 | Bistrick et al. | |
| 5,865,569 | A |   | 2/1999 | Holstein et al. | |
| 6,527,484 | B2 | * | 3/2003 | Nakamura et al. | 407/13 |
| 6,918,716 | B2 | * | 7/2005 | Berktold et al. | 407/18 |
| 2002/0015622 | A1 | | 2/2002 | Nakamura et al. | |
| 2003/0103817 | A1 | * | 6/2003 | Berktold et al. | 407/18 |

FOREIGN PATENT DOCUMENTS

EP    1 160 040    12/2001
JP    63-185515    8/1988

OTHER PUBLICATIONS

Alleinverkauf Der Normblätter Durch Beuth-Vertrieb GMBH, "Räumwerkzeuge", Sep. 1973, vol. 12 No. 459 (M-770), 2 DIN 1415, Japan.

* cited by examiner

*Primary Examiner*—Monica Carter
*Assistant Examiner*—Sara Addisu
(74) *Attorney, Agent, or Firm*—Browdy and Neimark, PLLC

(57) ABSTRACT

An internal broach for internally broaching profiles, defined by a bottom and flanks, of female serrations of a work piece having a toothed section with several rows of broach cutting teeth, the rows being disposed successively counter to a direction of broaching, with successive broach cutting teeth being allocated to each other for broaching a profile. The broach cutting teeth have bottom cutting blades and first and second sides. The first sides are guide flanks, the edges of which are guide edges without cutting ability. The second sides are relieved flanks, the edges of which are relieved edges without cutting ability.

9 Claims, 5 Drawing Sheets

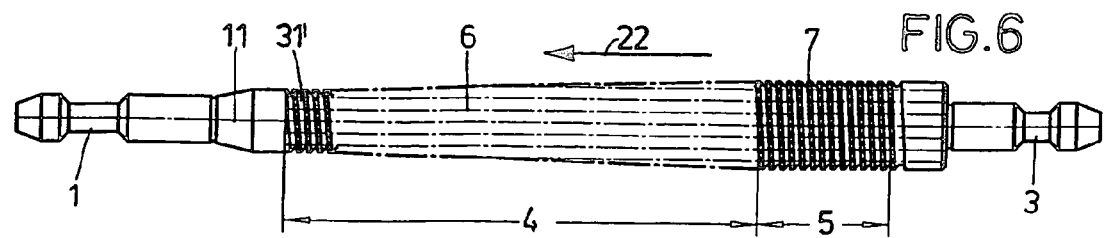
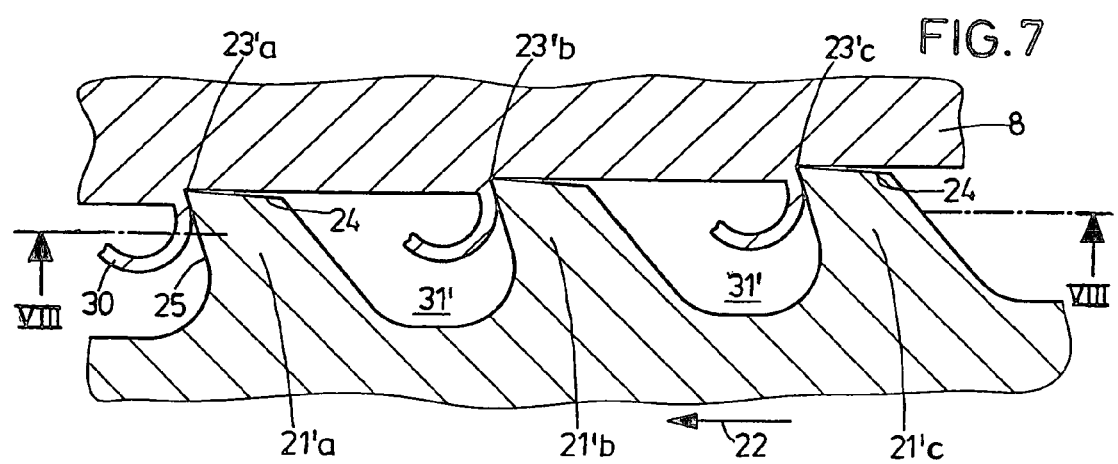
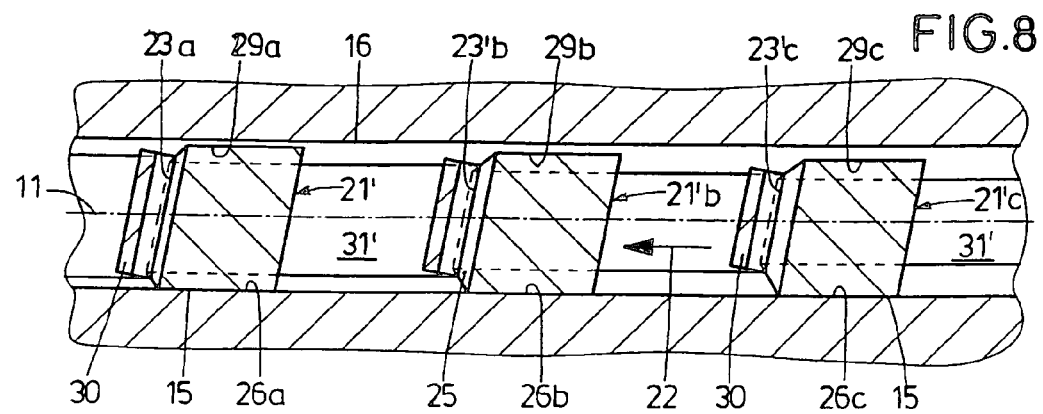

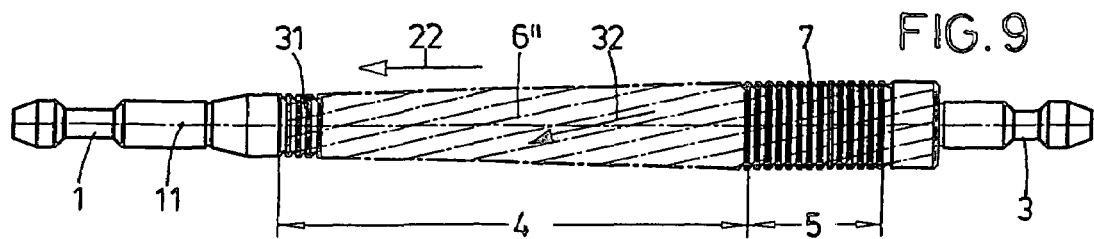
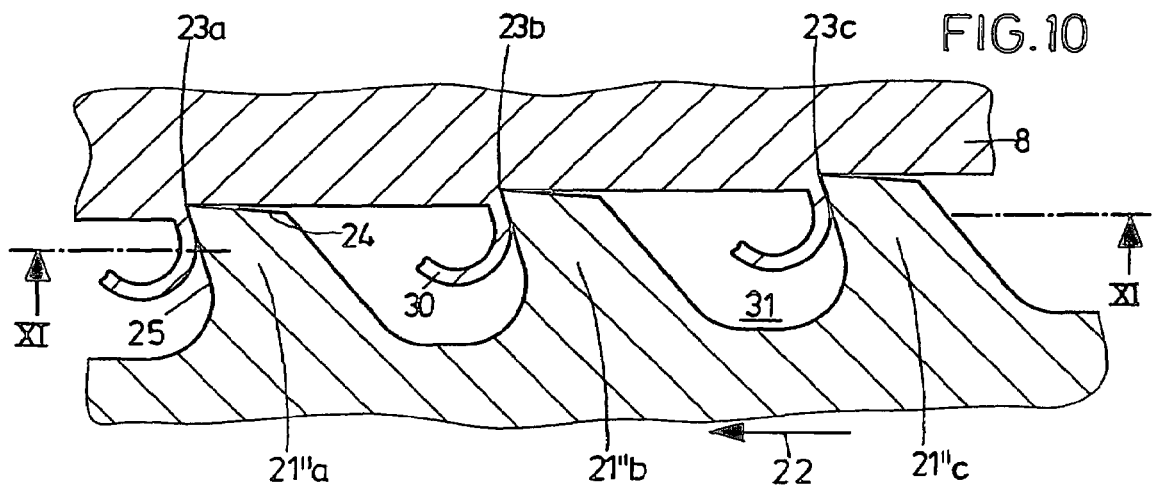
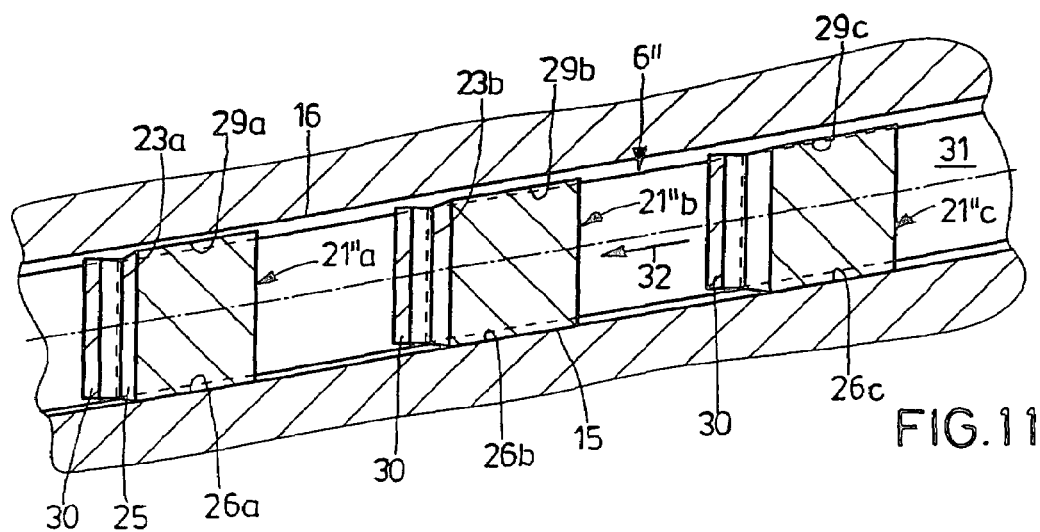

INTERNAL BROACH

BACKGROUND OF THE INVENTION

1. Field of the Invention

The invention relates to an internal broach for internally broaching profiles defined by a bottom and flanks, in particular female serrations, in a work piece, comprising a shank, which leads in a direction of broaching and has a central longitudinal axis; and a toothed section with several rows of broach cutting teeth, the rows being disposed successively counter to the direction of broaching; with successive broach cutting teeth being allocated to each other for broaching a profile of a depth; with the broach cutting teeth having bottom cutting blades and first and second sides; with the bottom cutting blades of successive and associated broach cutting teeth having a pitch a relative to the broach cutting teeth that lead in the direction of broaching; with a bottom-cutting-blade relief surface being allocated to the bottom cutting blades; and with the first and second sides passing through the bottom-cutting-blade relief surfaces while forming first and second edges.

2. Background Art

The internal broaches conventionally used for internal profile broaching are known from DIN 1415 (ed. 1973), sheet 1, page 2. They have a shank, a toothed section and a tail end. The shank is held by a broaching machine puller, which pulls the broach through a work piece held in the broaching machine, broaching the profiles in doing so. After the broaching operation, the tail end is seized by a retriever of the broaching machine, which returns the broach after the broaching operation into its initial position. Counter to the direction of broaching, the toothed section comprises several rows of broach cutting teeth, as a rule a great number of these rows of broach cutting teeth. The broach cutting teeth have blades for cutting the bottom of a profile and blades for cutting the flanks of the profile. The broach cutting teeth are disposed successively counter to the direction of broaching and are allocated to each other in this regard, serving to machine a profile; they are progressively stepped in depth i.e., they have a diametric pitch, so that all the broach cutting teeth that serve for machining a profile will successively cut a chip for producing the bottom of a profile.

Since the main machining operation is delivered by the bottom cutting blades, they are also called primary blades. For machining the flanks of a profile, the broach cutting teeth, which are disposed successively counter to the direction of broaching, have flank cutting blades of a back taper as illustrated in DIN 1415 (ed. 1973), sheet 1, page 3, picture 11. The flank cutting blades are also called secondary blades. The back taper is produced by the flank cutting blades of a subsequent tooth being relieved laterally as compared to the flank cutting blades of a leading tooth, so that the flank cutting blades of a subsequent tooth only machine the area provided by diametric pitch or back taper, and do not engage with the work piece in the area where the flank cutting blades of the leading tooth have machined. This helps prevent the broach cutting teeth from being clamped in the vicinity of the profile flanks during the broaching operation. The result is a stepped surface structure of the profile flanks.

The profiles produced by a familiar and customary internal broach have sufficient surface quality, accuracy of profile shape and flank curve for standard applications and requirements. During the broaching operation, displacement of the axis of the broach may occur so that each of the successively engaging teeth has a varying center position relative to the work piece that is to be machined. In particular in the case of twist broaching (helical broaching), torsional deviation may be superimposed on such a displacement of the axis of the broach; the torsional deviation is caused by rotatory forces during twist broaching. Very often, profile accuracy and flank surface quality are not sufficient in this case, flank curve accuracy being satisfactory as a rule. High accuracy of profile shape and flank curve are demanded in particular in the case of running gears such as female serrated gears with spur teeth or helical teeth.

In order to remedy the mentioned deficiencies in the case of correspondingly high demands, it has been familiar practice to provide the broach with a sizing section downstream of the back-tapered broach cutting teeth—seen in the direction of broaching. Such a sizing section comprises several successive broach cutting teeth of identical height, which do not regroove the bottom of the profile. However, they have tooth thicknesses that increase counter to the direction of broaching i.e., all the sizing teeth cut a chip over the full height of the profile flank, the chip thickness generally being 10 to 20 μm. Each flank cutting blade of the sizing teeth must have a relief produced by grinding i.e., it must have a relief angle. They are relief-ground. Sizing helps obtain excellent accuracy of profile shape and high surface quality. Flank curve accuracy deteriorates as compared to the profile broached by progressive stepping. This is due to the fact that the relief-ground flank cutting blades of the sizing teeth are sharp cutting edges of comparatively bad self-guidance behavior.

It is inherent in the system that any changeover from a progressively stepped broaching operation to full form sizing is accompanied with a break in the broaching force, which leads to considerable drawbacks, in particular in the case of twist broaching. Relieving the main cutting force that acts counter to the direction of broaching will lead to a reduction in torsional stress i.e., the torsion of the work piece relative to the internal broach changes. This change may be sufficiently strong so that the full form sizing section is not led correctly into the progressively broached profiles and, as a result, machines the flanks unilaterally so that the profile is not sized on both flanks. Owing to the mentioned deficiencies of the profile produced by progressively stepped broaching, the flank cutting blades of the broach cutting teeth will cut irregularly into the stepped flanks of the profile, with torsional vibrations originating which may negatively affect flank curve accuracy.

U.S. Pat. No. 2,986,801 teaches an internal broach for internally broaching female serrations, which are defined by a bottom and flanks, in a work piece. The bottom cutting blades of successive and associated broach cutting teeth have a positive diametrical pitch as compared to the broach cutting teeth that lead in the direction of broaching. The flank cutting blades of successive and associated broach cutting teeth have a negative diametrical pitch over their full height. This means that the contours of successive broach cutting teeth narrow as the diameter grows. The resulting drawbacks correspond to the drawbacks specified above in connection with DIN 1415 (ed. 1973).

For elimination of the above-mentioned drawbacks in an internal broach, U.S. Pat. No. 5,865,569 teaches to obtain improved surface quality and accuracy of profile shape and flank curves in that the flank cutting blades of successive and associated broach cutting teeth, over their full height, have a pitch that is small relative to the diametrical pitch of the bottom cutting blades. In this known embodiment, the chip space bottom of the broach cutting teeth must be below the web of the profile i.e., below the top circle of the profile that is to be produced, because all the flank cutting blades are defined downwardly by the web of the profile. In the case of great height of the profiles that are to be produced, this will lead to wide spacings of teeth, which has the consequence that, with a given number of broach cutting teeth, the broach becomes too long. If however the spacing of teeth is reduced in spite of too great a height of the profile that is to be produced, this may lead to grinding problems. Within certain dimensional ranges of the profiles, exploiting the advantages of the design of the generic type will therefore be restricted. In particular in the case of twist broaching, the use of these broaches requires broaching machines of high rigidity and accurate twist actuation.

For elimination of the described problems, EP 1 160 040 A1 teaches, in an internal broach of a similar type, to provide broach cutting teeth with flank cutting blades that adjoin the bottom cutting blades. The height of the flank cutting blades is considerably less than the depth of the total profile that is to be broached and substantially exceeds the pitch of the individual broach cutting tooth. These partial flank cutting blades are provided with flank relief surfaces. The sides, adjoining the partial flank cutting blades, of the broach cutting teeth are relieved surfaces. This is intended to help accomplish high flank curve accuracy, good self-guidance behavior being expected. However, the problem of broach deviation i.e., the problem of the central longitudinal axis of the broach deviating from its desired position relative to the work piece, cannot be solved in a satisfying fashion.

SUMMARY OF THE INVENTION

It is an object of the invention to embody an internal broach of the generic type for any deviation of the broach during profile broaching to be avoided or at least substantially reduced.

According to the invention, this object is attained by the features wherein the first sides are guide flanks, with the first edges being guide edges without cutting ability; wherein the second sides are relieved surfaces, with the second edges being non-cutting relieved edges; and wherein the bottom cutting blades are designed for cutting over a full profile width b. One of the two sides of each broach cutting tooth neither has a relief angle nor a relieved position, therefore being a non-cutting guide flank that is not capable of machining. The opposite, second side is relieved in position over its entire height and length. It is also non-cutting and is not in touch with the neighboring flank that is to be broached. Broaching takes place exclusively by means of the bottom cutting blade. As a result of the measures according to the invention, any deviation of the central longitudinal axis of the broach from its original and thus nominal position is hampered or at least largely prevented by the guide flanks, upon any such motion, being pressed against the corresponding flanks of the work piece approximately along half the circumference of the broach. With no chip removal taking place on the guide edges of the guide flanks, this lateral motion i.e., deviation of the broach, cannot take place. Consequently, the invention is of special advantage whenever a broach possesses several broach cutting teeth distributed over the circumference.

Emphasis is laid on the fact that the measures according to the invention can be used in broaches with annular chip spaces and helically disposed chip spaces and in twist broaches with twist-style rows of broach cutting teeth.

Further features, advantages and details of the invention will become apparent from the ensuing description of four exemplary embodiments, taken in conjunction with the drawing.

BRIEF DESCRIPTION OF THE DRAWING

FIG. 6 is a longitudinal plan view of a second embodiment of a broach;

FIG. 7 is a partial longitudinal view of the second embodiment;

FIG. 8 is a partial longitudinal section of the second embodiment on the line VIII-VIII of FIG. 7;

FIG. 9 is a longitudinal plan view of a third embodiment of a broach;

FIG. 10 is a partial longitudinal view of the third embodiment;

FIG. 11 is a partial longitudinal section of the third embodiment on the line XI-XI of FIG. 10;

DESCRIPTION OF PREFERRED EMBODIMENTS

Figure 1:
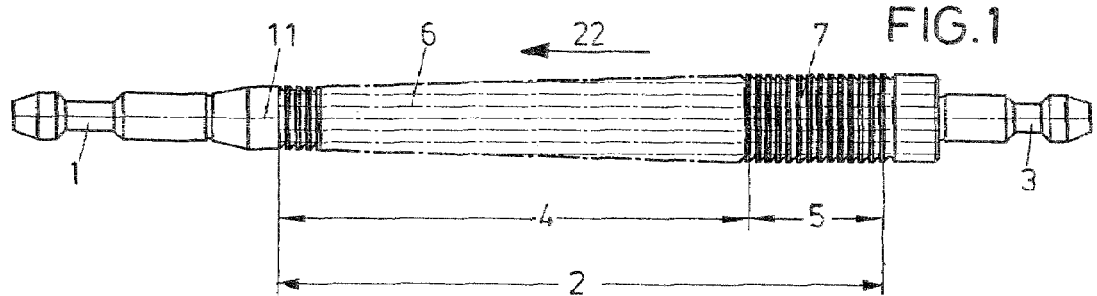
FIG. 1 is a longitudinal plan view of a first embodiment of an internal broach.

The internal broach seen in FIG. 1, the fundamental structure of which is familiar, comprises a shank 1, a toothed section 2 and a tail end 3 subsequent thereto. The toothed section 2 includes a broaching portion 4 subsequent to the shank 1 and an adjoining sizing portion 5 upstream of the tail end 3. The broaching portion 4 has several rows 6 of broach cutting teeth that will be explained below. The sizing portion 5 also includes a number of rows 7 of sizing teeth.

Figure 2:
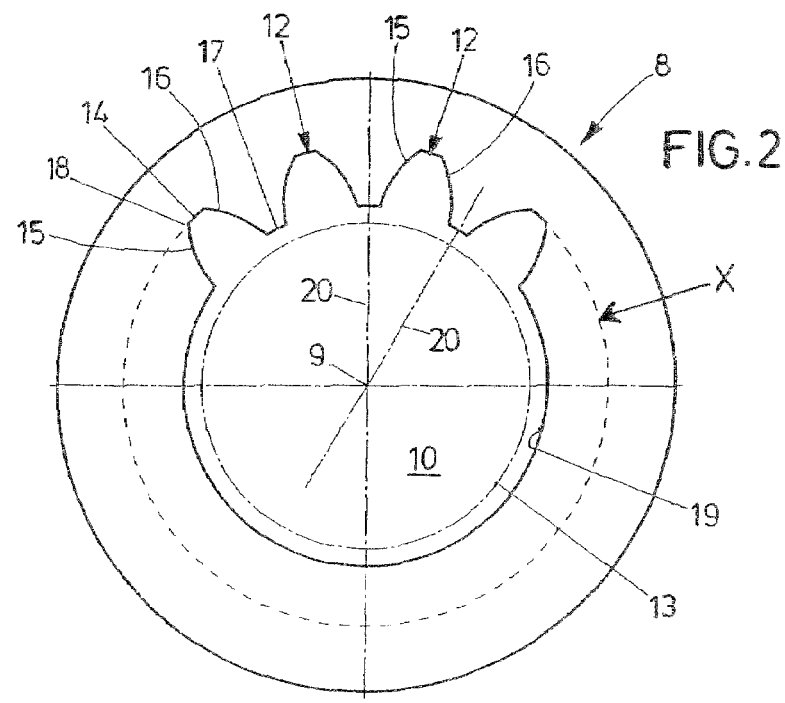
FIG. 2 is a plan view of a work piece that is profiled in the way a female serration.

The broach serves to machine for instance an annular work piece 8 which is illustrated in FIG. 2. Prior to being broached, it has a borehole 10 concentric of the central longitudinal axis 9 of the finished work piece 8. The work piece 8 is placed on a work piece support of an internal broaching machine; then the shank 1 of the broach is led through the borehole 10 and seized by a puller of the broaching machine, the puller being drivable in the direction of the axis 11 of the broach, drawing the broach through the work piece 8. In doing so, profiles 12, for instance female serrations, are broached into the internal circumference 13 of the work piece 8. The internal broach is not positively guided, there being self-guidance and self-centering between the work piece 8 and the broach i.e., there is the fundamental requirement that the axis 11 of the broach and the axis 9 of the work piece 8 coincide. The tail end 3 primarily serves to return the internal broach after a broaching stroke. The broach can be employed not only on pull broaching machines, but on so-called lifting-table broaching machines as well as on push broaching machines.

The profiles 12 to be broached have a bottom 14, two opposite flanks 15, 16 and a web 17 that joins to each other the neighboring flanks 15, 16 of two neighboring profiles 12. The flanks 15, 16 of a profile 12 combine with the bottom 14 to form a corner 18. When the profiles 12 are broached, the borehole 10 can be widened, forming a recess 19 defined by the webs 17. The following does not deal with explaining the job of broaching the work piece 8 in the vicinity of the webs 17 that are to be produced, this being of no relevance to the understanding of the invention. The following deals with a profile 12 broaching operation in which the profile 12 is disposed between two radiuses 20 through the axis 9 that bisect webs 17 that adjoin the profile 12.

Figure 3:
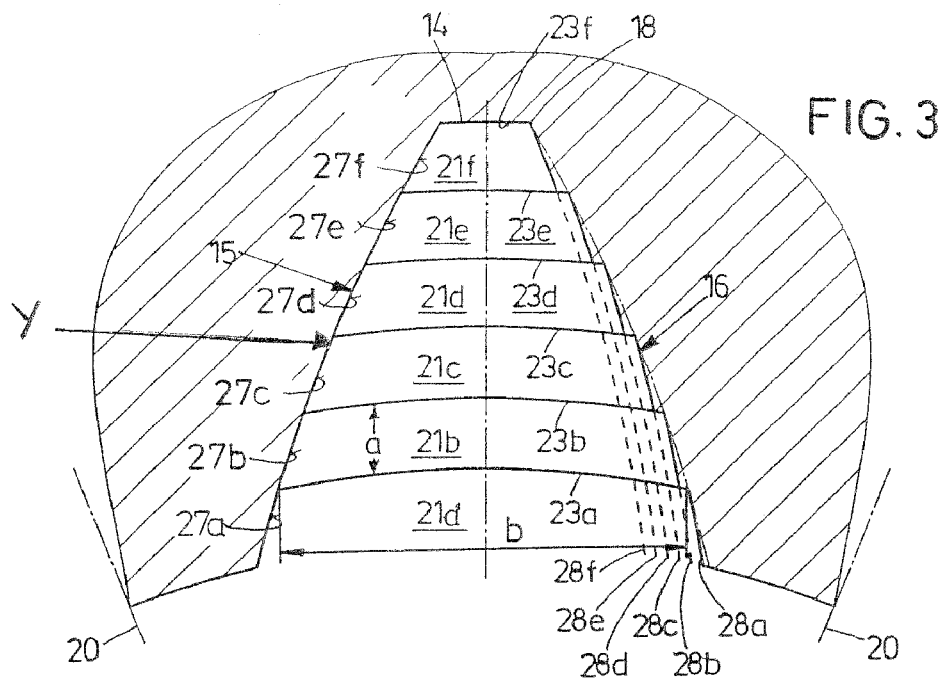
FIG. 3 is a partial cross-sectional view of the first embodiment of a broach in engagement with the work piece.
Figure 4:
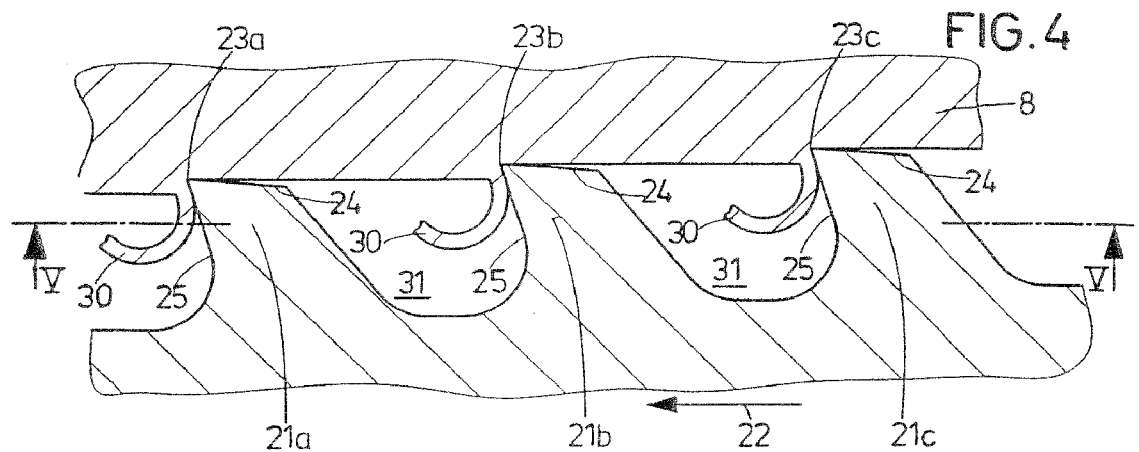
FIG. 4 is a partial longitudinal view of the first embodiment.
Figure 5:
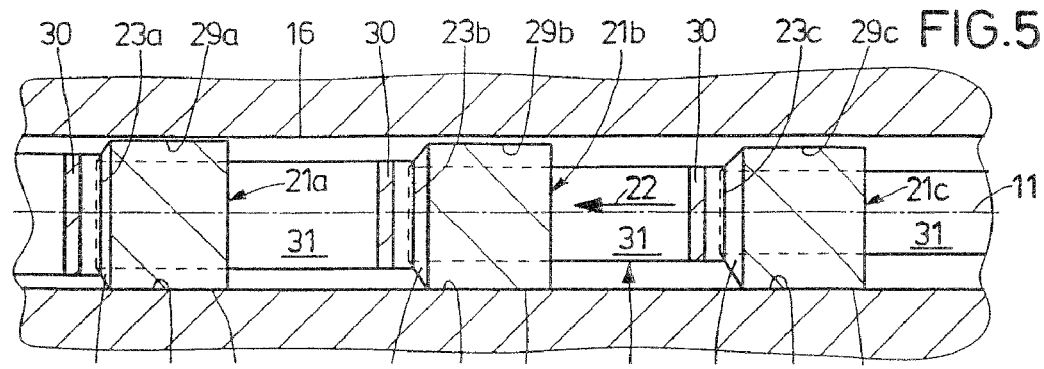
FIG. 5 is a partial longitudinal section of the first embodiment on the line V-V of FIG. 4.

A first exemplary embodiment, according to the invention, of an internal broach according to FIGS. 3 to 5 comprises broach cutting teeth 21, a first tooth of which being designated by 21a, further teeth by 21b, 21c, 21d, 21e, and a last tooth by 21f. Even if only a total of six broach cutting teeth 21 are illustrated, at least five to twenty times the number of teeth—depending on the depth of profile to be produced—are available in practice in the broaching portion 4 of a broach. The broach cutting teeth 21a to 21f are arranged on the broach counter to the direction of broaching 22. The broach cutting teeth 21a to 21f each have a bottom cutting blade 23a to 23f, called primary blade in practice, which extends in the course of a circle that is concentric of the axis 11. For example, FIG. 2 shows cutting blade 23f extending as an arc of circle X. The bottom cutting blades 23a to 23f are customarily provided with a relief produced by grinding i.e., a relief angle.

They have a bottom cutting blade relief surface 24 in the form of a single curved plane and a machining surface 25, as seen in FIGS. 4 and 5.

The sides of the broach cutting teeth 21 that are allocated to the flanks 15, 16 of the work piece 8, which are to be produced, vary in design. The sides of the broach cutting teeth 21a to 21f lie in a single curved plane Y as shown in FIG. 3 and are allocated to a flank 15—on the left in FIG. 3—are pure guide flanks 26a to 26f. Over the full flank height, their course corresponds to the course of the flank 15 that is to be produced. They do not possess a relief produced by grinding or a relief angle i.e., they are not designed as a relief surface as seen in FIG. 5, and are not relieved in position as seen in FIG. 5. The pitch a between the teeth as shown in FIG. 3 is in the range of 10 to 80 µm. The guide edge 27a to 27f between the respective guide flank 26a to 26c and the machining surface 25 is a non-cutting edge 27a to 27f without cutting ability.

The opposite edges, on the right in FIG. 3, which are allocated to the flank 16 that is to be produced, are relieved edges 28a to 28f. This means that the surfaces which adjoin them and are turned towards the to-be-produced flank 16 are relieved surfaces 29a to 29c that do not rest on the to-be-produced flank 16 as far as to the corner 18 i.e., until engagement with the bottom cutting blade 23. As opposed to this, the bottom cutting blades 23a to 23f reach over the full width b of the profile that is to be produced at a respective place by a respective broach cutting tooth 21a to 21f.

As seen in FIG. 4, where only three broach cutting teeth 21a, 21b and 21c are illustrated, the respective bottom cutting blade 23a to 23c serves to broach a chip 30 that corresponds to the pitch a. As seen in FIG. 5, the guide flanks 26a to 26c, by the respective guide edge 27a to 27c, rest on the to-be-produced flank 15 of the work piece 8 over their full length and without any flank pitch. The chip 30, and thus also the flank 15, is formed in the vicinity of the pitch a, it being stressed again that the cutting operation takes place over the full width b. Consequently, also the relieved edge 28a to 28f is a non-cutting edge. The mentioned design relates to a broach with annular chip spaces 31 and a straight course of profile, with the broach being moved without rotation relative to the work piece 8. The broach cutting teeth 21, successive counter to the direction of broaching 22, lie in rows that are parallel to the axis 11, as roughly outlined in FIG. 1.

If, in this embodiment of the broach, the central longitudinal axis 11 is displaced crosswise of its nominal position relative to the axis 9 of the work piece 8, then the guide flanks 26 of the broach are pressed against the corresponding flanks 15 of the work piece 8 approximately along half the circumference of the work piece 8. The guide edges 27 of the guide flanks 26 not being able of chip removal, any such deviation of the broach relative to the work piece 8 is not possible in theory and largely precluded in practice. On the other hand, any clamping occasioned by material resiliency of the work piece 8 is precluded by the relieved position of the respectively opposite relieved surface 29 and relieved edge 28.

At the end of a broach cutting job by the broaching portion 4, the flanks 15 and 16 are finished. Sizing by means of the sizing portion 5 may still take place, depending on quality requirements.

The embodiment according to FIGS. 6 to 8 differs from that according to FIGS. 3 to 5 only in that the chip spaces 31' do not extend annularly, but helically. The broach cutting teeth 21'a to 21'c, successive counter to the direction of broaching 22, are disposed in rows 6 that are parallel to the axis 11. Only FIG. 8 shows that the bottom cutting blades 23'a to 23'c are designed to lag from the guide flank 26a to 26c towards the relieved surface 29a to 29c, which still increases the guide forces between the guide flank 26a to 26c and the flank 15. Otherwise the above description applies. The illustration according to FIG. 3 applies too.

In the embodiment according to FIGS. 9 to 11, the chip spaces 31 are arranged annularly, which also applies to the annular arrangement of broach cutting teeth in FIG. 9. The broach cutting teeth 21"a to 21"c, successive counter to the direction of broaching 22, are disposed in helical or twist-style arrangement, as outlined by the corresponding twist-style rows 6" in FIGS. 9 and 11. The twist direction 32 of the rows 6" is such that the pressure between the guide flanks 26a to 26c and the flanks 15 of the work piece 8 is increased upon a broaching stroke. The illustration according to FIG. 3 applies here too.

Figure 12:
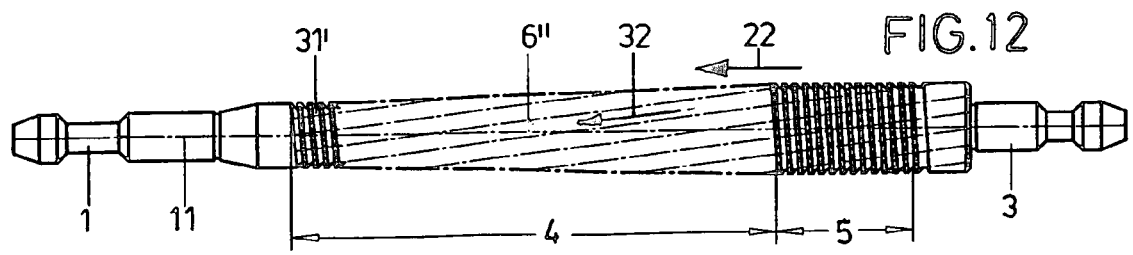
FIG. 12 is a longitudinal plan view of a fourth embodiment of a broach.
Figure 13:
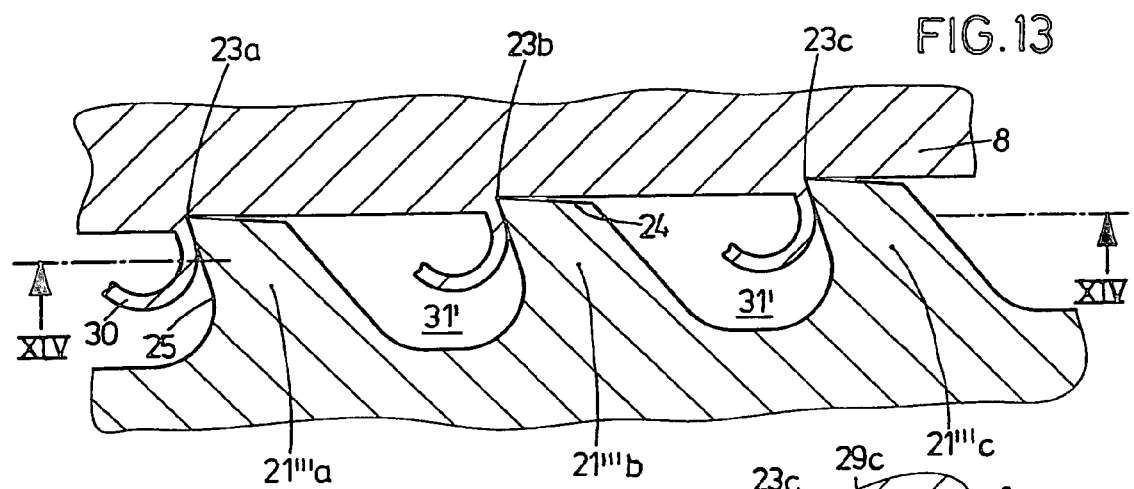
FIG. 13 is a partial longitudinal section of the fourth embodiment of a broach.
Figure 14:
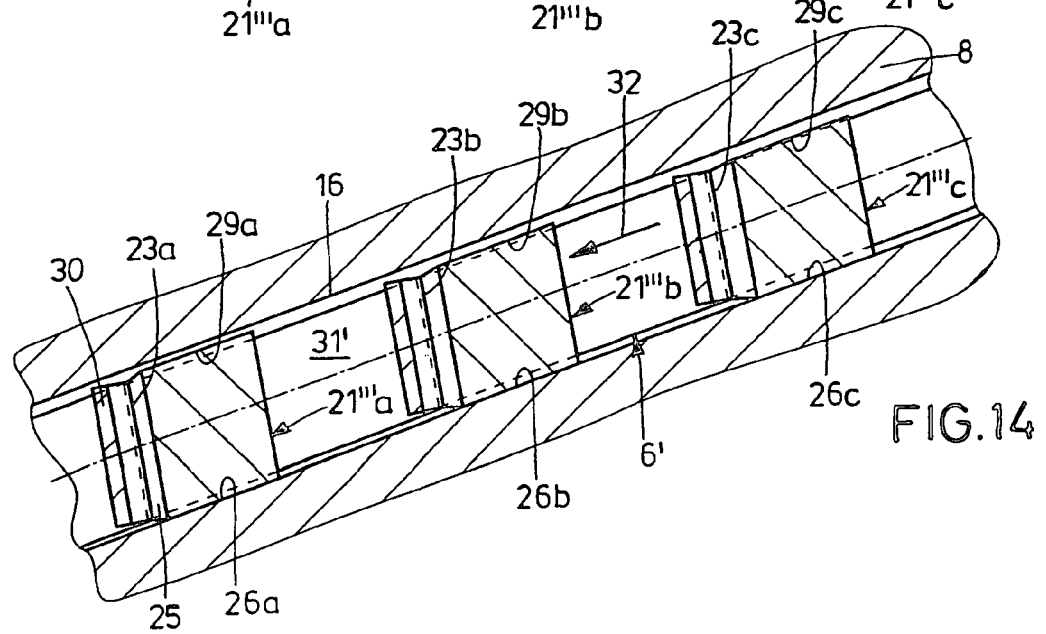
FIG. 14 is a partial longitudinal section of the fourth embodiment on the line XIV-XIV of FIG. 13.

In the fourth embodiment according to FIGS. 12 to 14, provision is made for a helical course of the chip spaces 31' and correspondingly a helical course of the broach cutting teeth 21'''a to 21'''c, as roughly outlined in FIGS. 12 and 14. Furthermore, the rows 6' of the successive broach cutting teeth 21'''a to 21"c are provided to have a twist-style or helical course. In this regard, the description of the second and third embodiment applies where applicable.

What is claimed is:

1. An internal broach having broach cutting teeth for internally broaching final profiles (12), wherein each of the broach cutting teeth cut a chip which in total form a final bottom (14) and final profile flanks (15, 16), of female serrations of a work piece (8), comprising a shank (1), which leads in a direction of broaching (22) and has a central longitudinal axis (9); and a toothed section (2) with several rows (6) of broach cutting teeth (21a to 21f), the rows (6) being disposed successively counter to the direction of broaching (22); with successive broach cutting teeth (21a to 21f) being allocated to each other for broaching a profile (12) of a depth;

with each of all the broach cutting teeth (21a to 21f) in the several rows of the toothed section having only one each of first and second sides respectively facing the final profile flanks and a bottom cutting blade (23a to 23f) forming an edge on a bottom cutting blade relief surface (24) which edge extends as an arc of a circle between the first and second sides so that the cutting blade cuts over a full final profile width (b);

wherein the circles are concentric;

wherein the bottom cutting blades (23a to 23f) of successive and associated broach cutting teeth (21a to 21f) each cut the chip to a thickness corresponding to a pitch (a) between the broach cutting teeth (21a to 21f) that lead in the direction of broaching (22) and forms the final bottom and a portion of the entire final profile flanks (15, 16) corresponding to the thickness of the chip cut, and;

wherein the first and second sides join the bottom-cutting-blade relief surface (24) and form first and second edges;

wherein all of the first sides are guide flanks (26a to 26f), lie within a same curved plane with the first edges being guide edges (27a to 27f) without a cutting ability to form the allocated profile flank (15);

wherein all of the second sides are relieved surfaces (29a to 29c) which do not touch the profiled flank (16) that the second sides face and which each extend in its own curved plane over the entire height of the respective broach cutting teeth, wherein all of the second edges are relieved edges (28a to 28f) without a cutting ability to form the allocated profile flank in the vicinity of the pitch (a), and wherein the broaching of the final profiles takes place exclusively by means of the bottom cutting blades.

2. An internal broach according to claim 1, wherein the guide edges (28a to 28f) of successive broach cutting teeth (21a to 21f) have no flank pitch.

3. An internal broach according to claim 1, wherein the broach cutting teeth (21) which are side by side relative to the direction of broaching (22), are disposed such that with respect to the central longitudinal axis (11) annular chip spaces (31) are arranged; and wherein broach cutting teeth (21a to 21f), successive counter to the direction of broaching (22), are disposed in rows (6) so that all of the first and second sides are parallel to the central longitudinal axis (9).

4. An internal broach according to claim 1, wherein broach cutting teeth (21) which are side by side relative to the direction of broaching, are disposed such that with respect to the central longitudinal axis (11) helically extending chip spaces (31') are arranged; and wherein broach cutting teeth (21a to 21f), successive counter to the direction of broaching (22), are disposed in rows (6) so that all of the first and second sides are parallel to the central longitudinal axis (9).

5. An internal broach according to claim 1, wherein the broach cutting teeth (21") which are side by side relative to the direction of broaching (22), are disposed such that with respect to the central longitudinal axis (11) annular chip spaces (31) are arranged; and wherein the broach cutting teeth (21"a to 21"c), successive counter to the direction of broaching (22), are disposed in twist-style rows (6").

6. An internal broach according to claim 1, wherein the broach cutting teeth (21''') which are side by side relative to the direction of broaching (22), are disposed such that with respect to the central longitudinal axis (11) helically extending chip spaces (31') are arranged; and wherein the broach cutting teeth (21'''a to 21'''c), successive counter to the direction of broaching (22), are disposed in twist-style rows (6").

7. An internal broach according to claim 1, wherein the pitch (a) is within a range of 10 to 80mm.

8. An internal broach having broach cutting teeth for internally broaching final profiles (12), wherein each of the broach cutting teeth cut a chip which in total form a final bottom (14) and final profile flanks (15, 16), of female serrations of a work piece (8), comprising a shank (1), which leads in a direction of broaching (22) and has a central longitudinal axis (9); and a toothed section (2) with several rows (6) of broach cutting teeth (21a to 21f), the rows (6) being disposed successively counter to the direction of broaching (22);

with successive broach cutting teeth (21a to 21f) being allocated to each other for broaching a profile (12) of a depth;

with each of all the broach cutting teeth (21a to 21f) in the several rows of the toothed section having only one each of first and second sides respectively facing the final profile flanks and a bottom cutting blade (23a to 23f) forming an edge on a bottom cutting blade relief surface (24) which edge extends as an arc of a circle between the first and second sides so that the cutting blade cuts over a full final profile width (b);

wherein the circles are concentric;

wherein the bottom cutting blades (23a to 23f) of successive and associated broach cutting teeth (21a to 21f) each cut the chip to a thickness corresponding to a pitch (a) between the broach cutting teeth (21a to 21f) that lead in the direction of broaching (22) and forms the final bottom and a portion of the entire final profile flanks (15, 16) corresponding to the thickness of the chip cut, and;

wherein the first and second sides join the bottom-cutting-blade relief surface (24) and form first and second edges; wherein all of the first sides are guide flanks (26a to 26f), lie within a same curved plane with the first edges being guide edges (27a to 27f) without a cutting ability to form the allocated profile flank (15);

wherein all of the second sides are relieved surfaces (29a to 29c) which do not touch the profiled flank (16) that the second sides face and which each extend in its own curved plane over the entire height of the respective broach cutting teeth, wherein all of the second edges are relieved edges (28a to 28f) without a cutting ability to form the allocated profile flank in the vicinity of the pitch (a);

wherein the broach cutting teeth (21) which are side by side relative to the direction of broaching (22), are disposed such that with respect to the central longitudinal axis (11) annular chip spaces (31) are arranged; and wherein broach cutting teeth (21a to 21f), successive counter to the direction of broaching (22), are disposed in rows (6) so that all of the first and second sides are parallel to the central longitudinal axis (9), and wherein the broaching of the final profiles takes place exclusively by means of the bottom cutting blades.

9. An internal broach having broach cutting teeth for internally broaching final profiles (12), wherein each of the broach cutting teeth cut a chip which in total form a final bottom (14) and final profile flanks (15, 16), of female serrations of a work piece (8), comprising
- a shank (1), which leads in a direction of broaching (22) and has a central longitudinal axis (9); and
- a toothed section (2) with several rows (6) of broach cutting teeth (21*a* to 21*f*), the rows (6) being disposed successively counter to the direction of broaching (22);
- with successive broach cutting teeth (21*a* to 21*f*) being allocated to each other for broaching a profile (12) of a depth;
- with each of all the broach cutting teeth (21*a* to 21*f*) in the several rows of the toothed section having only one each of first and second sides respectively facing the final profile flanks and a bottom cutting blade (23*a* to 23*f*) forming an edge on a bottom cutting blade relief surface (24) which edge extends as an arc of a circle between the first and second sides so that the cutting blade cuts over a full final profile width (b);
- wherein the circles are concentric;
- wherein the bottom cutting blades (23*a* to 23*f*) of successive and associated broach cutting teeth (21*a* to 21*f*) each cut the chip to a thickness corresponding to a pitch (a) between the broach cutting teeth (21*a* to 21*f*) that lead in the direction of broaching (22) and forms the final bottom and a portion of the entire final profile flanks (15, 16) formed corresponding to the thickness of the chip cut, and;
- wherein the first and second sides join the bottom-cutting-blade relief surface (24) and form first and second edges;
- wherein all of the first sides are guide flanks (26*a* to 26*f*), lie within a same curved plane with the first edges being guide edges (27*a* to 27*f*) without a cutting ability to form the allocated profile flank (15);
- wherein all of the second sides are relieved surfaces (29*a* to 29*c*) which do not touch the profiled flank (16) that the second sides face and which each extend in its own curved plane over the entire height of the respective broach cutting teeth, wherein all of the second edges are relieved edges (28*a* to 28*f*) without a cutting ability to form the allocated profile flank in the vicinity of the pitch (a);
- wherein broach cutting teeth (21) which are side by side relative to the direction of broaching, are disposed such that with respect to the central longitudinal axis (11) helically extending chip spaces (31') are arranged; and
- wherein broach cutting teeth (21*a* to 2l*f*) successive counter to the direction of broaching (22), are disposed in rows (6) so that all of the first and second sides are parallel to the central longitudinal axis (9), and
- wherein the broaching of the final profiles takes place exclusively by means of the bottom cutting blades.

* * * * *